United States Patent
Mori

(10) Patent No.: US 6,740,004 B2
(45) Date of Patent: May 25, 2004

(54) CONTROL APPARATUS OF AN AUTOMATIC TRANSMISSION AND A METHOD FOR CONTROLLING A SHIFT OPERATION OF AN AUTOMATIC TRANSMISSION

(75) Inventor: Masanori Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 29 days.

(21) Appl. No.: 10/167,082

(22) Filed: Jun. 12, 2002

(65) Prior Publication Data
US 2002/0198078 A1 Dec. 26, 2002

(30) Foreign Application Priority Data
Jun. 12, 2001 (JP) ......................... 2001-177746

(51) Int. Cl.⁷ ............................................. F16H 59/66
(52) U.S. Cl. .................... 477/97; 477/174; 180/197
(58) Field of Search .................... 477/97, 110, 132, 477/136, 141, 148, 159, 162, 174, 175, 176; 180/197

(56) References Cited
U.S. PATENT DOCUMENTS 3,741,043 A * 6/1973 Oya et al. .................. 180/197
4,015,486 A * 4/1977 Zach, Jr. ..................... 475/296
4,840,247 A * 6/1989 Kashihara et al. ...... 180/197 X
5,265,693 A * 11/1993 Rees et al. ................. 180/197
5,405,301 A * 4/1995 Yagi et al. .............. 180/197 X
6,015,020 A * 1/2000 Sugiyama ................... 180/197

FOREIGN PATENT DOCUMENTS

| JP | 63-159149 A | | 7/1988 |
| JP | 402057440 | * | 2/1990 |
| JP | 411020514 | * | 1/1999 |

* cited by examiner

*Primary Examiner*—Ha Ho
(74) *Attorney, Agent, or Firm*—Burns, Doane, Swecker & Mathis, L.L.P.

(57) ABSTRACT

A control system of an automatic transmission comprises a slip detecting mechanism for detecting a vehicle wheel slippage, an up-shifting mechanism for up-shifting a shift stage when vehicle wheel slippage is detected, and a down-shift line setting mechanism for setting a first down-shift line at a lower vehicle speed side than that of a second down-shift line which had been set before performing the up-shift operation. The first down-shift line is newly set only when the vehicle wheel slippage has been eliminated by the up-shifting operation.

17 Claims, 4 Drawing Sheets

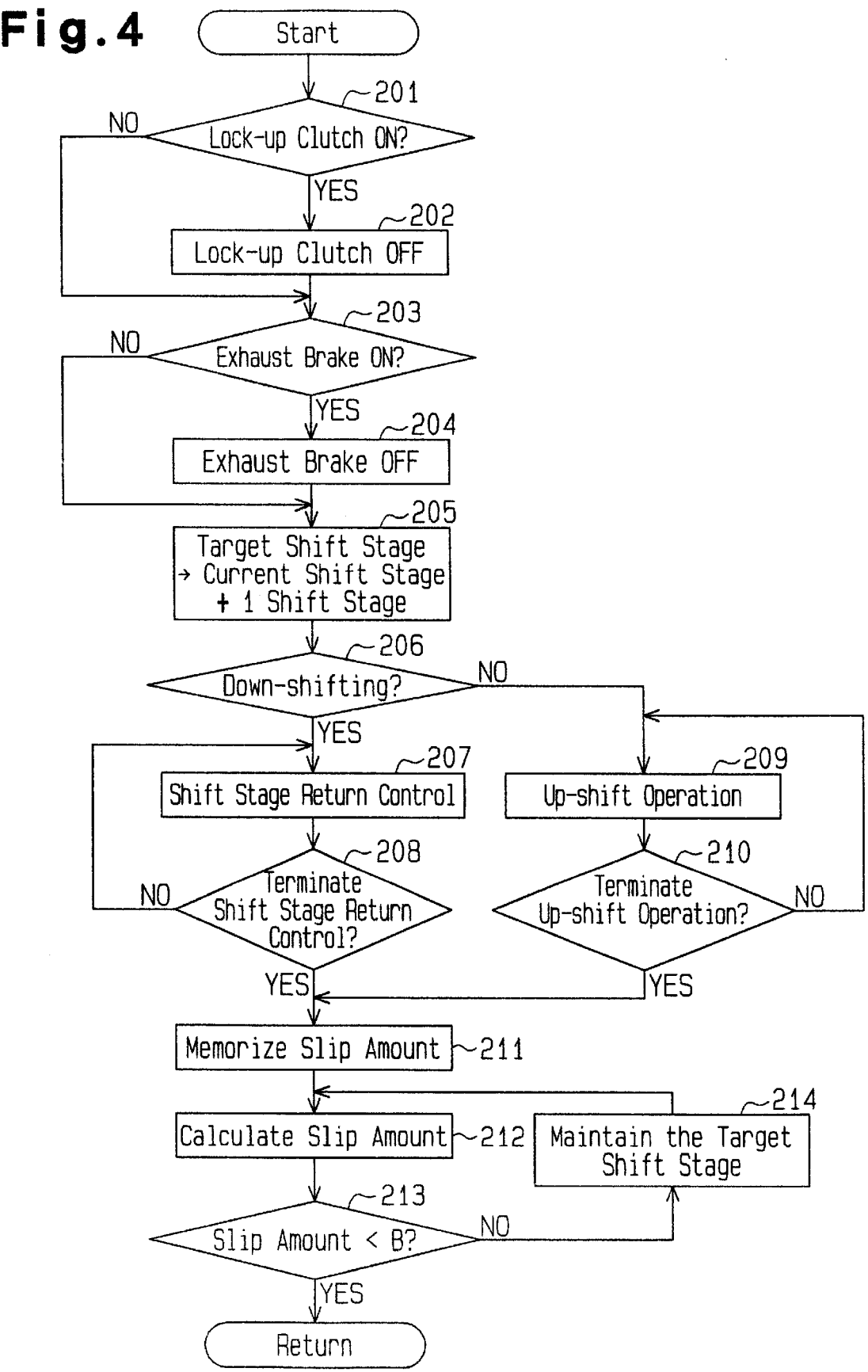

CONTROL APPARATUS OF AN AUTOMATIC TRANSMISSION AND A METHOD FOR CONTROLLING A SHIFT OPERATION OF AN AUTOMATIC TRANSMISSION

This application is based on and claims priority under 35 U.S.C. § 119 with respect to Japanese Patent Application No. 2001-177746, filed on Jun. 12, 2001, the entire content of which is incorporated herein by reference.

FIELD OF THE INVENTION

This invention generally relates to a control apparatus of an automatic transmission and a method for controlling a shift operation of an automatic transmission. More particularly, this invention pertains to a control apparatus of an automatic transmission for restraining a vehicle wheel slippage.

BACKGROUND OF THE INVENTION

An engine brake system as a control apparatus of an automatic transmission is disclosed in a Japanese Patent Laid-open application 63(1988-)159149, the disclosure of which is incorporated by reference herein. The engine brake system disclosed therein is provided with a detecting means for detecting a rotational speed (rpm) of a driving wheel, another detecting means for detecting a rotational speed of a driven wheel, and an up-shifting means for up-shifting a gear stage of a transmission. More particularly, the gear stage of the transmission is up-shifted when a difference between the rotational speed of the driving wheel and the one driven wheel exceeds a predetermined value.

According to the above described engine brake system, the slipping condition can be accurately estimated based upon the directly detected difference between the rotational speeds of the driving wheel and the one driven wheel. As described above, the gear stage of the transmission is up-shifted when the rotational speed difference exceeds the predetermined value, i.e. when any one of the wheels is slipping. The vehicle engine braking force is hence reduced in response to the up-shift operation of the gear stage of the transmission. Therefore, the vehicle can be prevented from reaching a completely slipping condition even when the vehicle engine braking force becomes greater than a vertical load of the driving wheel relative to a ground so as to tend to slip the driving wheel.

However, when the gear stage of the transmission is down-shifted based upon a shift pattern immediately after the vehicle completely slipping condition was prevented from occurring by performing the up-shift operation, the engine braking force in response to the down-shift operation becomes greater than the vertical force of the driving wheel relative to the ground. Further, the driving wheel may be slipped again with a high potentiality so that the vehicle may not be stably driven.

Accordingly, the control apparatus of the automatic transmission for restraining the vehicle wheel slip by the up-shift operation are still susceptible of certain improvements with respect to stabilizing the vehicle running condition immediately after the vehicle completely slipping condition was prevented from occurring.

SUMMARY OF THE INVENTION

According to an aspect of the present invention, a control system of an automatic transmission comprises a slip detecting means for detecting a vehicle wheel slip, an up-shifting means for up-shifting a shift stage when the vehicle wheel slip is detected by the slip detecting mean, and a down-shift line setting means for setting a first down-shift line at a lower vehicle speed side than a vehicle speed of a second down-shift line which had been set before performing the up-shift operation by the up-shifting means. More specifically, the first down-shift line is newly set only when the vehicle wheel slip is not detected any more by performing the up-shift operation by the up-shifting means.

According to another aspect thereof, it is preferable that the control system of the automatic transmission further comprises a road inclination detecting means for detecting an inclination of a vehicle running road and a shift pattern switching means for switching a shift pattern of the automatic transmission corresponding to the road inclination detected by the road inclination detecting means. In such a case, the down-shift line is set by the down-shift line setting means in response to the shift pattern switched by the shift pattern switching means when the vehicle wheel slip is not detected any more by performing the up-shift operation by the up-shifting means.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 4 illustrates a flow chart showing an up-shift operation performed when a vehicle wheel slip is detected.

DETAILED DESCRIPTION OF A PREFERRED EMBODIMENT

Figure 1:
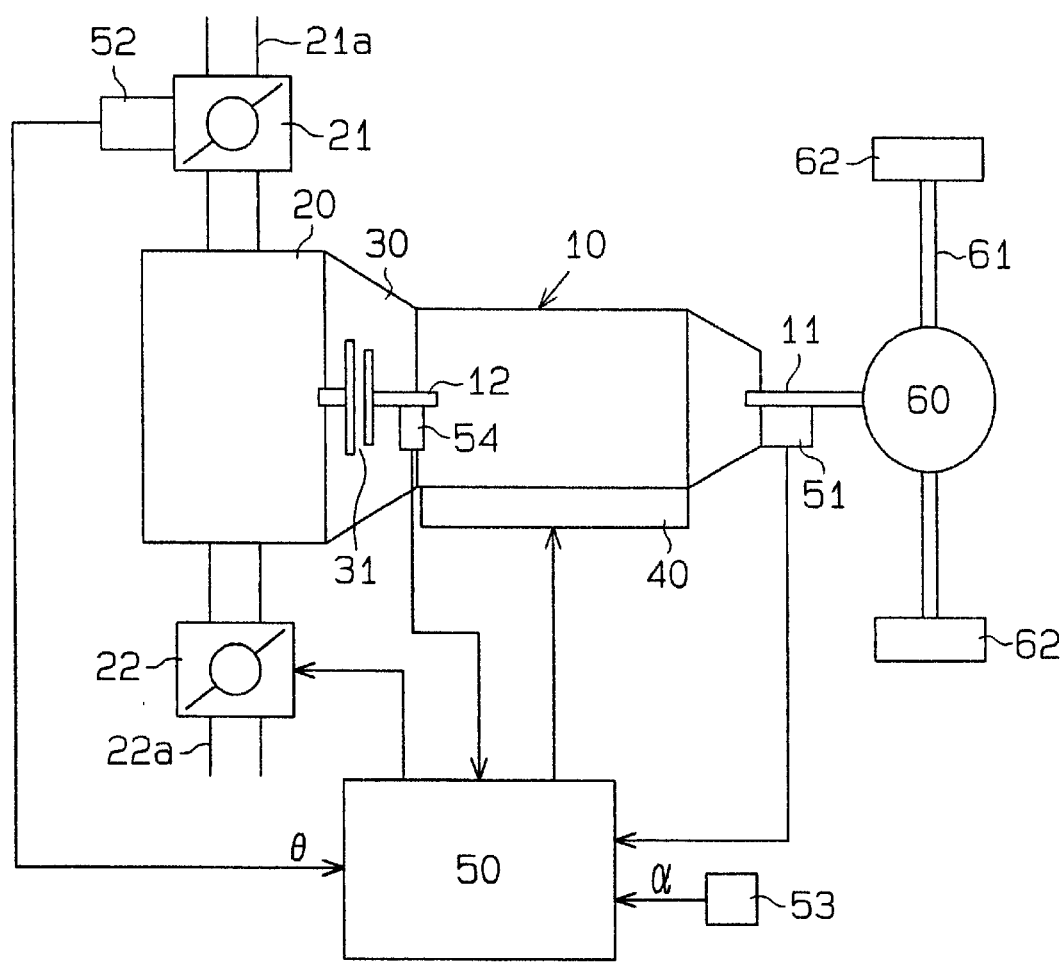
FIG. 1 is a block view schematically illustrating a control system of an automatic transmission according to an embodiment of the present invention.

Referring to FIG. 1, a control system of an automatic transmission according to a preferred embodiment of the present invention includes an automatic transmission 10 with a planetary gear train for five forward shift stages, an engine 20, a torque converter 30 disposed between the transmission 10 and the engine 20 for transmitting a driving force therebetween, an oil pressure control device 40, an exhaust brake 22, and a control unit 50. The automatic transmission 10 is provided with conventional friction engagement elements (not shown) for effecting a desired shift stage. The oil pressure control device 40 controls an engaging operation and a disengaging operation of the friction engagement elements. The control unit 50 is inputted with various vehicle signals and controls an operation of the engine 20, a shift operation of the transmission 10, and an ON/OFF operation of the exhaust brake 22 based upon the inputted vehicle signals.

More specifically, the control unit 50 is provided with a controller for controlling the transmission 10. The oil pressure control device 40 is provided with a plurality of electromagnetic valves (not shown). The control unit 50 controls an electric current to be supplied to the electromagnetic valves so that an oil pressure supplied to each friction engagement element is regulated. Accordingly, a desired shift stage can be performed. The torque converter 30 is provided with a lock-up clutch 31 for connecting an input side of the torque converter 30 and an output side thereof. The lock-up clutch 31 is switched to be ON or OFF corresponding to a vehicle running condition. Further, an output shaft 11 of the transmission 10 is operatively connected to an axel shaft 61 via a differential gear 60. Vehicle wheels 62 are fixed to both ends of the axel shaft 61. An exhaust conduit 22a of the engine 20 is provided with an exhaust brake 22. When the exhaust brake 22 is ON, a desired engine brake operation can be performed cooperatively with the transmission 10. An air intake conduit 21a of the engine 20 is provided with a throttle valve 21 operatively associated with an accelerator pedal (not shown).

The control unit 50 is inputted with various signals from various vehicle sensors. For example, the control unit 50 is inputted with signals from an output shaft rotation sensor 51 for detecting a rotational speed of the output shaft 11, a throttle sensor 52 for detecting a throttle opening degree $\theta$ of the throttle valve 21, a road inclination sensor 53 (a road inclination detecting means) for detecting a road inclination $\alpha$, a toque detecting sensor 54 for detecting a driving toque of an input shaft 12 of the transmission 10. The throttle opening degree $\theta$ is proportional to a depressing amount applied to the accelerator pedal by a driver.

Further, the control unit 50 represents the control apparatus of the automatic transmission 10 and is provided with a slip detecting means for detecting a vehicle wheel slip, an up-shifting means for shifting up a current shift stage which has been performed when the vehicle wheel slip is detected by the slip detecting means, a down-shift line setting means for setting a down-shift line (a first down-shift line) at a lower vehicle speed side than a vehicle speed of a down-shift line (a second down-shift line) which had been set before performing the up-shift operation, and a shift pattern switching means for switching a shift pattern of the transmission 10 depending on the road inclination $\alpha$ detected by the road inclination sensor 53. The vehicle wheel slip represents a condition that an actual moving distance of the vehicle is increased relative to a vehicle wheel rotation corresponding to the vehicle engine braking force which becomes greater than a vertical force of the vehicle wheel 62 relative to the ground. The slip amount is a numerical value representing an actual vehicle moving distance relative to the vehicle wheel rotation. The slip amount is increased corresponding to an increase of the difference between the actual vehicle moving distance and the vehicle wheel rotation.

Figure 2:
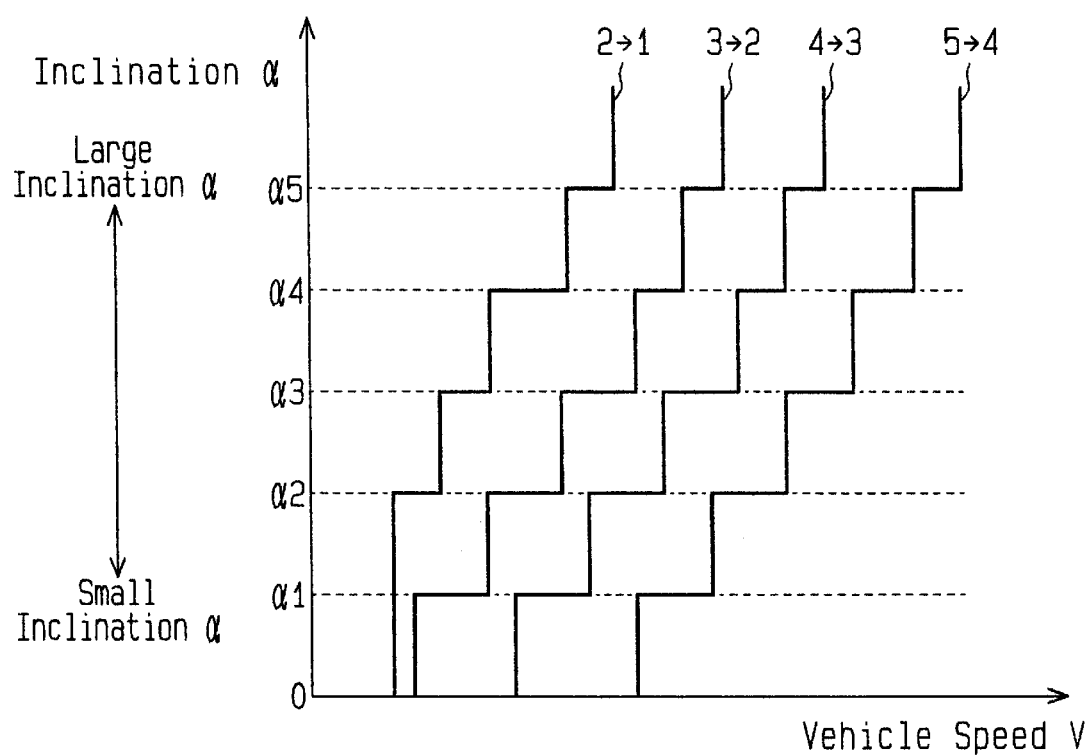
FIG. 2 is a graph illustrating a deceleration shift pattern according to the embodiment of the present invention.

The control unit 50 according to the embodiment of the present invention serves for setting a normal shift pattern and a deceleration shift pattern as illustrated in FIG. 2. The normal shift pattern is set for the up-shift operation and the down-shift operation based upon a vehicle speed V and the throttle opening degree $\theta$. The deceleration shift pattern is set for performing the up-shift operation and the down-shift operation based upon the road inclination $\alpha$ and the vehicle speed V when the throttle opening degree $\theta$ is equal to or smaller than a predetermined opening degree and when the vehicle is decelerating on a down slope. When the throttle opening degree $\theta$ is equal to or smaller than the predetermined opening degree, the accelerator pedal is assumed to be under the non-depressed condition. As illustrated in FIG. 2, only the down-shift line is illustrated in a graph and an up-shift line is omitted therefrom. The road inclination $\alpha$ is divided into six ranges; a first range between zero and $\alpha 1$, a second range between $\alpha 1$ and $\alpha 2$, a third range between $\alpha 2$ and $\alpha 3$, a fourth range between $\alpha 3$ and $\alpha 4$, a fifth range between $\alpha 4$ and $\alpha 5$, and a sixth range being greater than $\alpha 5$. Therefore, six different deceleration six patterns corresponding to each amount of the road inclination $\alpha$ are totally set from the first range to the sixth range, respectively. The down-shift line is preset for increasing the engine braking force corresponding to the increase of the road inclination $\alpha$. That is, the deceleration shift pattern is preset for setting the down-shift line at a higher vehicle speed side corresponding to the increase of the road inclination $\alpha$. The vehicle speed V is calculated based upon the signal from the output shaft rotation sensor 51 of the transmission 10. The ON/OFF operation of the lock-up clutch 31 and the ON/OFF operation of the exhaust brake 22 are switched based upon the road inclination $\alpha$ and the vehicle speed V when the shift operation is performed based upon the deceleration shift pattern.

Figure 3:
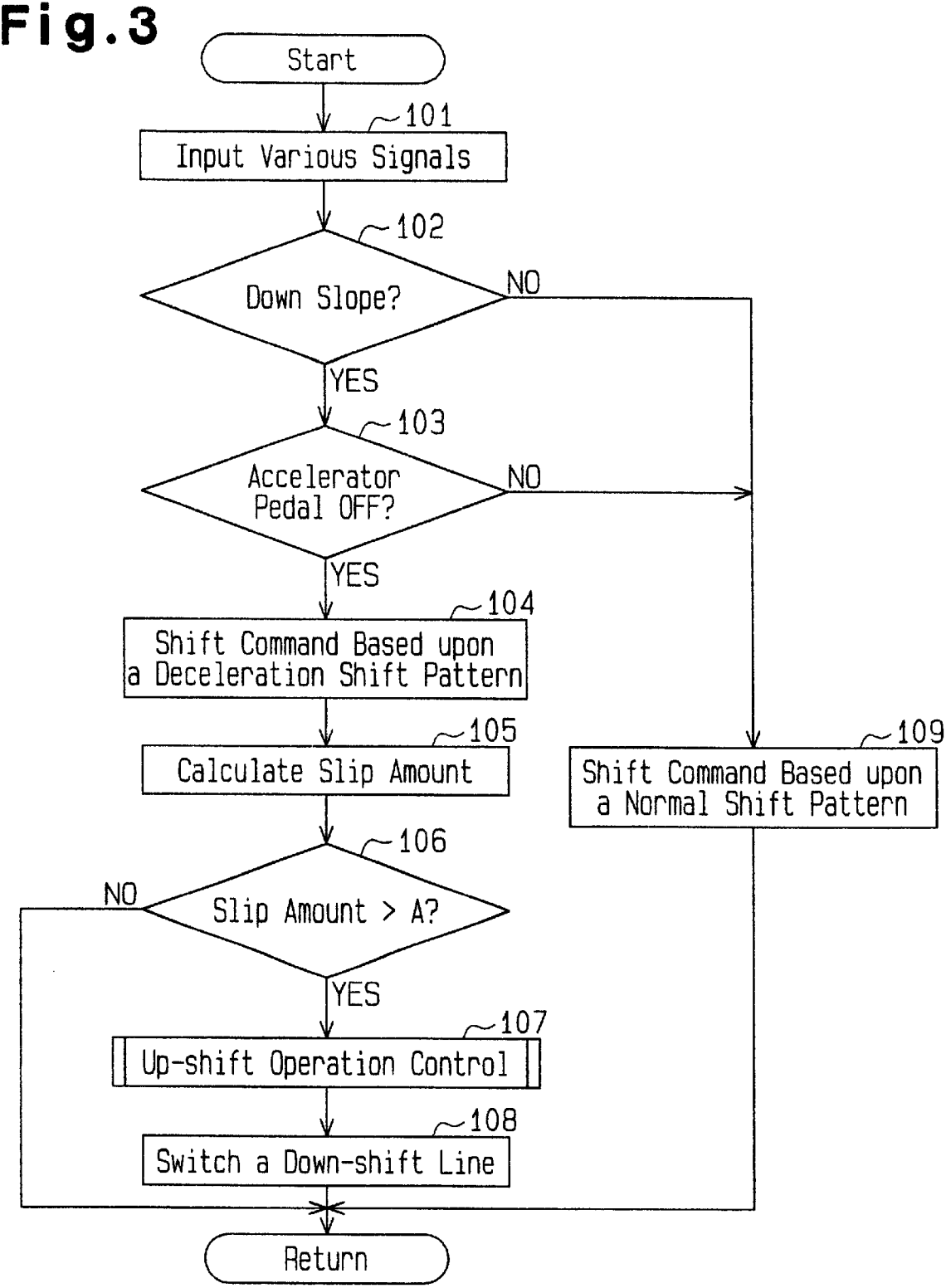
FIG. 3 illustrates a flow chart showing a control of the automatic transmission according to the embodiment of the present invention.

Hereinafter, the shift operation of the transmission 10 controlled by the control unit 50 is described below with reference to a flow chart illustrated in FIG. 3. The control of the shift operation by the control unit 50 is initiated at every predetermined period of time. Primarily, various signals representing such as the road inclination $\alpha$, the vehicle speed V, the throttle opening degree $\theta$ (an acceleration opening degree) are inputted to the control unit 50 at step 101. At step 102, the control unit 50 judges whether or not the vehicle running road is the down slope. When the vehicle running road is judged to be the down slope, the program proceeds to step 103 for judging whether or not the accelerator pedal is OFF, i.e. for judging whether or not the accelerator pedal has been depressed by the driver. When the accelerator pedal is judged to be OFF, the program proceeds to step 104 for performing the shift operation in response to a shift command by the deceleration shift pattern.

A gravity acceleration corresponding to the road inclination $\alpha$ is applied to a vehicle running direction when the vehicle runs on the down slope. Therefore, the vehicle deceleration on the down slope becomes smaller than the one on a flat road. Therefore, a sufficient vehicle deceleration might not be obtained by the vehicle engine braking force while the vehicle is running on the down slope based upon the normal shift pattern employed on the flat road. To overcome the problem, the deceleration shift pattern according to the embodiment of the present invention is employed for setting the shift pattern of the transmission 10 in a direction for increasing the engine braking force relative to the normal shift pattern. In other words, the down-shift operation according to the embodiment of the present invention can be performed at a higher vehicle speed side relative to the normal shift pattern. Therefore, the sufficient vehicle deceleration can be effectively obtained even when the engine braking force is increased during the vehicle running on the down slope.

While the shift operation is performed following the shift command by the deceleration shift pattern corresponding to the road inclination $\alpha$, the program then proceeds to step 105 for calculating the slip amount of the vehicle wheel. The vehicle wheel slip amount is calculated based upon a difference between an estimated deceleration estimated from the driving torque of the input shaft 12 of the transmission 10 and an actual vehicle deceleration detected based upon a rotational speed of the axle shaft 61. The estimated deceleration is calculated by dividing a value of the driving torque of the input shaft 12 multiplied by a gear ratio and a differential gear ratio by a radius of the vehicle wheel 62 and a vehicle weight. The actual vehicle deceleration is calculated by multiplying the variation of the rotational speed of the output shaft 11 per unit of time by a circumference of the vehicle wheel 62. The slip amount of the vehicle wheel 62 is calculated by multiplying the difference between the estimated deceleration and the actual deceleration by the time. Therefore, the number of rotation sensors for calculating the vehicle wheel slip amount is not increased. Further, the vehicle wheel slip amount can be calculated accurately with reference to the difference between the estimated deceleration and the actual deceleration. At step 106, the control unit 50 judges whether or not the slip amount of the vehicle wheel 62 calculated at step 105 is greater than a predetermined amount A which is preset at a very small amount. When the slip amount calculated at step 105 is greater than the predetermined amount A, the vehicle wheel 62 is judged to be under the slipping condition.

When the slip amount is judged to be greater than the predetermined amount A at step 106, the vehicle wheel 62 is judged to be under the slipping condition. The program then proceeds to step 107 for controlling the up-shift operation in response to the slip of the vehicle wheel 62. Referring to a flow chart illustrated in FIG. 4, when the up-shift operation is performed, the control unit 20 primarily judges whether or not the lock-up clutch 31 is ON at step 201. When the lock-up clutch 31 is judged to be ON at step 201, the program proceeds to step 202 so as to turn OFF the lock-up clutch 31. The program then proceeds to step 203. On the other hand, when the lock-up clutch 31 is judged to be OFF at step 201, the program directly proceeds to step 203. The control unit 20 judges at step 203 whether or not the exhaust brake 22 is ON. When the exhaust brake 22 is judged to be ON at step 203, the program then proceeds to step 204 so as to turn OFF the exhaust brake 22. The program then proceeds to step 205. On the other hand, when the exhaust brake 22 is judged to be OFF at step 203, the program directly proceeds to step 205. At step 205, a target shift stage is set at a shift stage up-shifted by one shift stage from the current shift stage. Assuming that a down-shift operation had been performed at step 104, then when the target shift stage is set at step 205, the shift stage existing immediately before the down-shift operation is set as the current shift stage. At step 206, the control unit 20 judges whether or not the down-shift operation had been performed by the transmission 10 at step 104. If it is determined that the down-shift operation had not been performed, i.e. when the shift operation had not been performed or when an up-shift operation had been performed, the program then proceeds to step 209 for performing the up-shift operation. When the up-shift operation is judged to have been completed at step 210, the program then proceeds to step 211.

On the other hand, when the control unit 20 judges at step 206 that a down-shift operation had been performed at step 104, the program then proceeds to step 207 for performing a shift stage return operation. The shift stage return operation is performed for returning the current shift stage to the former shift stage existing before the down-shifting operation had been performed. The shift stage return operation corresponds to an up-shift operation of the transmission 10. When the shift stage return operation is judged to have been completed at step 208, the program then proceeds to step 211 for memorizing the slip amount occurring at the time when the up-shift operation was initialized. At step 212, a slip amount is calculated again in the same manner as step 105. At step 213, the control unit 20 judges whether or not the slip amount calculated at step 213 is smaller than a predetermined amount B which is preset at a very small amount. The predetermined amount B is equal to the predetermined amount A at step 106 or smaller than that. That is, the vehicle wheel 62 is judged not to be under the slipping condition when the slip amount is smaller than the predetermined amount B. When the slip amount is judged at step 213 to be equal to the predetermined amount B or greater than that, the vehicle wheel 62 is judged to be still under the slipping condition. Therefore, the program then proceeds to step 214 for maintaining the target shift stage set at step 205. Assuming the engine braking force is decreased by maintaining the target shift stage, the engine braking force becomes smaller than the vertical force of the vehicle wheel 62 relative to the ground. In this case, the vehicle wheel 62 is released from the slipping condition. The slip amount is then judged at step 213 to be smaller than the predetermined amount B. The program with reference to the flow chart in FIG. 4 is terminated and the program proceeds to step 108.

At step 108, the down-shift line of the transmission 10 is switched. The shift pattern in which the down-shift line is set at a lower vehicle speed side relative to the vehicle speed of the shift pattern set at step 104 is selected out of the six different deceleration shift patterns. For example, assuming that the road inclination $\alpha$ is within a range between $\alpha 4$ and $\alpha 5$, the shift operation at step 104 is performed based upon the shift pattern within the range between $\alpha 4$ and $\alpha 5$. However, the shift operation at step 107 is performed based upon the shift pattern within any one of the ranges of the road inclination $\alpha$ that is smaller than $\alpha 4$ in response to the termination of the control of the up-shift operation (step 107). The shift pattern to be selected at step 108 is determined based upon the slip amount memorized at step 211. That is, the shift pattern is switched for increasing the displacement amount of the down-shift line to the lower vehicle speed side corresponding to the increase of the slip amount of the vehicle wheel 62. Therefore, an appropriate down-shift line can be newly set corresponding to the vehicle wheel slip condition so that the engine braking force can be surely decreased after the vehicle wheel being released from the slip condition.

As described above, the up-shifted shift stage is maintained until the vehicle condition reaches the down-shift line newly set by the down-shift line setting means at step 108 after the vehicle wheel 62 is released from the slipping condition. That is, the vehicle will be driven with the decreased engine braking force so that the vehicle running stability can be effectively assured without performing the down-shift operation immediately after the vehicle wheel has been released from the slipping condition. Therefore, the down-shift operation is prevented from being performed immediately after the termination of the control of the up-shift operation, wherein the vehicle wheel 62 can be prevented from slipping again by performing the down-shift operation based upon the down-shift line newly set at step 108.

Further, according to the embodiment of the present invention, the down-shift line can be set at a lower vehicle speed side by employing at step 108 the shift pattern preset corresponding to the road inclination $\alpha$. Therefore, the down-shift line can be set without additionally setting the down-shift line by the down-shift line setting means. According to the embodiment of the present invention, the down-shift line at the lower vehicle speed side than the one of the down-shift line within the range between zero and $\alpha 1$ is not preset. Therefore, the down-shift line can not be switched to the lower vehicle speed side after the vehicle wheel 62 is returned from the slipping condition within the range of the road inclination $\alpha$ between zero and $\alpha 1$. However, the slip of the vehicle wheel 62 occurs while the vehicle is running on the road with a substantially high road inclination $\alpha$. The vehicle wheel 62 may rarely slip while the vehicle is running within the range of the road inclination α between zero and α1. However, another down-shift line can be set for switching the down-shift line to the lower vehicle speed side after the vehicle wheel 62 is returned from the slipping condition within the range of the road inclination α between zero and α1, if necessary.

Further, the shift pattern according to the embodiment of the present invention is switched for increasing the displacement amount of the down-shift line to the lower vehicle speed side corresponding to the increase of the vehicle deceleration.

Further, the down-shift line according to the embodiment of the present invention is newly set with reference to the road inclination α. Alternatively, the down-shift line can be newly set regardless of the road inclination α. In this case, the down-shift line newly set after performing the control of the up-shift operation is required to be exclusively applied to the control of the up-shift operation.

Further, the road inclination α according to the embodiment of the present invention is detected directly by the road inclination sensor 53. Alternatively, the road inclination α can be calculated from the driving torque of the input shaft 12 of the transmission 10.

Further, the automatic transmission 10 according to the embodiment of the present invention is a transmission of which principal structure is the automatic transmission provided with the planetary gear train and friction engagement elements. Alternatively, the automatic transmission 10 can be applicable to a synchromesh type automated manual transmission.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A control system of an automatic transmission comprising:
   a slip detecting means for detecting vehicle wheel slippage;
   an up-shifting means for up-shifting a shift stage in response to a detection of vehicle wheel slippage by the slip detecting means for eliminating the slippage; and
   a down-shift line setting means for selling a first down-shift line at a lower vehicle speed side than that of a second down-shift line which had been set before performing the up-shift operation.

2. A control system of an automatic transmission, according to claim 1, further comprising:
   a road inclination detecting means for detecting an inclination of a vehicle running road; and
   a shift pattern switching means for switching a shift pattern of the automatic transmission corresponding to the detected road inclination, wherein the down-shift line is set by the down-shift line setting means in response to the shift pattern switched by the shift pattern switching means when the slippage was eliminated.

3. A control system of an automatic transmission, according to claim 1, wherein a displacement amount of the second down-shift line set by the down-shift line setting means to the lower vehicle speed side is varied corresponding to an amount of detected slippage.

4. A control system of an automatic transmission, according to claim 2, wherein a displacement amount of the second down-shift line set by the down-shift line setting means to the lower vehicle speed side is varied corresponding to an amount of detected slippage.

5. A control system of an automatic transmission, according to claim 3, wherein the displacement amount of the second down-shift line set by the down-shift line setting means to the lower vehicle speed side is increased corresponding to an increase of the amount of slippage.

6. A control system of an automatic transmission, according to claim 4, wherein the displacement amount of the second down-shift line set by the down-shift line setting means to the lower vehicle speed side is increased corresponding to an increase of the amount of slippage.

7. A control system of an automatic transmission, according to claim 1, including means for detecting vehicle deceleration, wherein a displacement amount of the second down-shift line set by the down-shift line setting means to the lower vehicle speed side is varied corresponding to an amount of vehicle deceleration.

8. A control system of an automatic transmission, according to claim 2, including means for detecting vehicle deceleration, wherein a displacement amount of the second down-shift line set by the down-shift line setting means to the lower vehicle speed side is varied corresponding to an amount of vehicle deceleration.

9. A control system of an automatic transmission, according to claim 7, wherein the displacement amount of the second down-shift line set by the down-shift line setting means to the lower vehicle speed side is increased corresponding to an amount of increase of the vehicle deceleration.

10. A control system of an automatic transmission, according to claim 8, wherein the displacement amount of the second down-shift line set by the down-shift line setting means to the lower vehicle speed side is increased corresponding to an amount of increase of the vehicle deceleration.

11. A control system of an automatic transmission, according to claim 1, wherein the slip detecting means detects a vehicle wheel slippage amount based upon a difference between an estimated deceleration estimated from a driving torque of an input shaft of the automatic transmission and an actual vehicle deceleration.

12. A control system of an automatic transmission, according to claim 11, wherein the slip detecting means calculates the estimated deceleration by dividing a value of the driving torque of the input shaft, multiplied by a gear ratio and a differential gear ratio, by a radius of the vehicle wheel and a vehicle weight, and calculates the actual vehicle deceleration by multiplying a variation of an rpm of an output shaft of the automatic transmission per unit of time by a circumference of the vehicle wheel.

13. A control system of an automatic transmission, according to claim 2, wherein the road inclination detecting means detects the inclination of the vehicle running road by a detecting sensor.

14. A control system of an automatic transmission, according to claim 2, wherein the road inclination detecting means detects the inclination of the vehicle running road based upon a driving torque of an input shaft of the automatic transmission.

15. A method for controlling a shift operation of an automatic transmission, comprising the steps of:
   A. detecting an inclination of a vehicle running road;
   B. detecting a vehicle speed;
   C. detecting an engine throttle opening degree;
   D. inputting detected signals representing the inclination of the vehicle running road, the vehicle speed, and the throttle opening degree into a control unit;
   E. judging whether the vehicle is running on a down slope;
   F. judging whether an accelerator pedal is in the depressed condition when the vehicle is judged in step E to be running on a down slope;
   G. performing shift operation based upon shift command by a normal shift pattern when the vehicle is judged in step E to not be running on the down slope or when the accelerator pedal is judged in step F to be in the depressed condition;
   H. performing shift operation based upon shift command by a deceleration shift pattern when the accelerator pedal is judged in step F to not be in the depressed condition;
   I. calculating a vehicle wheel slip amount after performing the shift operation in step H;
   J. judging whether the calculated vehicle wheel slip amount calculated in step I is greater than a first predetermined value;
   K. turning off a lock-up clutch between the engine and the transmission when the calculated vehicle wheel slip amount is judged in step J to be greater than the first predetermined value;
   L. turning off an engine exhaust brake when the calculated vehicle wheel slip amount is judged in step J to be greater than the first predetermined value;
   M. determining a target shift stage equal to a current shift stage increased to one upper shift stage;
   N. performing an up-shift operation when the calculated vehicle wheel slip amount calculated in step I is greater than the first predetermined value;
   O. memorizing the vehicle wheel slip amount occurring when the up-shift operation of step N was initialized;
   P. calculating a vehicle wheel slip amount occurring after the up-shift operation was performed in step N;
   Q. judging whether the calculated vehicle wheel slip amount calculated in step P is smaller than a second predetermined value;
   R. setting a down-shift pattern based upon the memorized vehicle slip amount when the calculated vehicle wheel slip amount is judged in step Q to be smaller than the second predetermined value; and
   S. maintaining the target shift stage determined in step M, when the calculated vehicle wheel slip amount is judged in step Q to be equal to or greater than the second predetermined value.

16. A method for controlling a shift operation of an automatic transmission, according to claim 15, further including the step of determining whether a down-shift occurred in step H, and wherein step N comprises upshifting from the current shift stage when it is determined that no down-shift operation was performed, and step N comprises returning to a former shift stage when it is determined that a down-shift operation was performed.

17. A method for controlling a shift operation of an automatic transmission, according to claim 15, further including subsequent to step S, selecting a shift pattern in which a down-shift line set is displaced to a lower vehicle speed side than that of a down-shift line existing prior to step N, when the calculated vehicle wheel slip amount calculated in step P is smaller than the second predetermined value.

* * * * *